Dec. 23, 1952 W. A. PIPKIN ET AL 2,622,733
FEEDER FOR WHOLE CITRUS FRUIT
Filed Feb. 1, 1947 7 Sheets-Sheet 1
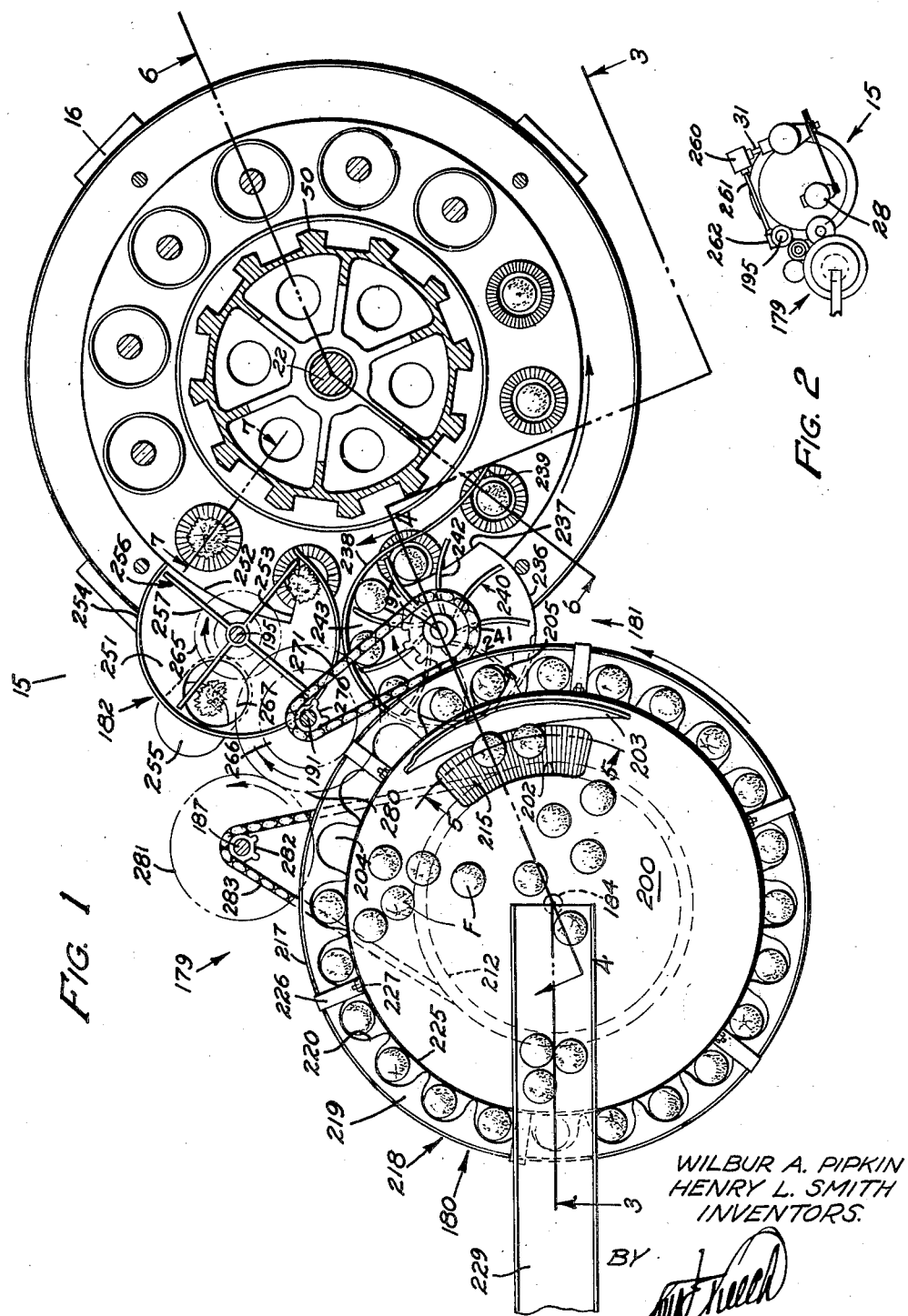
WILBUR A. PIPKIN
HENRY L. SMITH
INVENTORS.
BY 
ATTORNEY

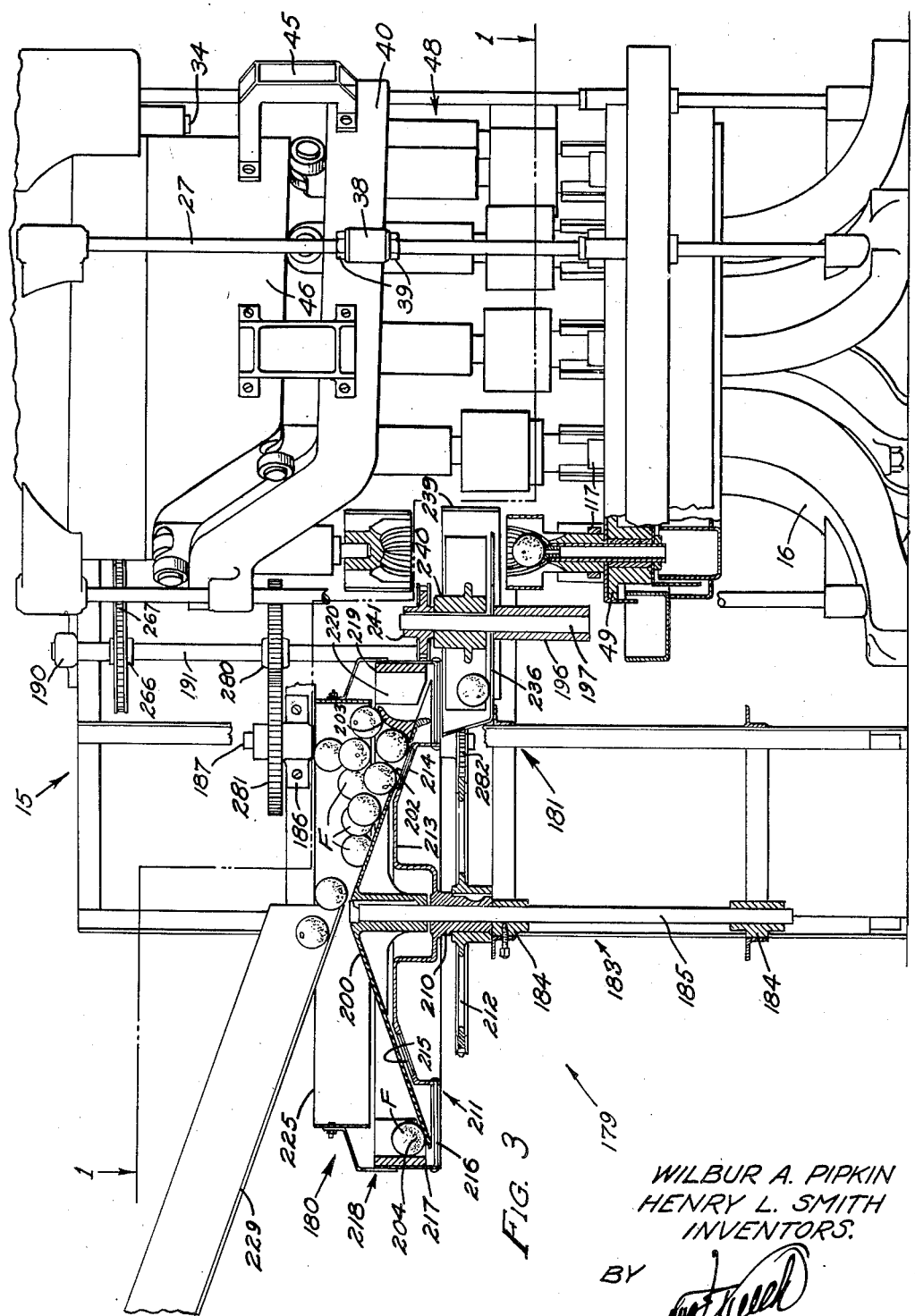

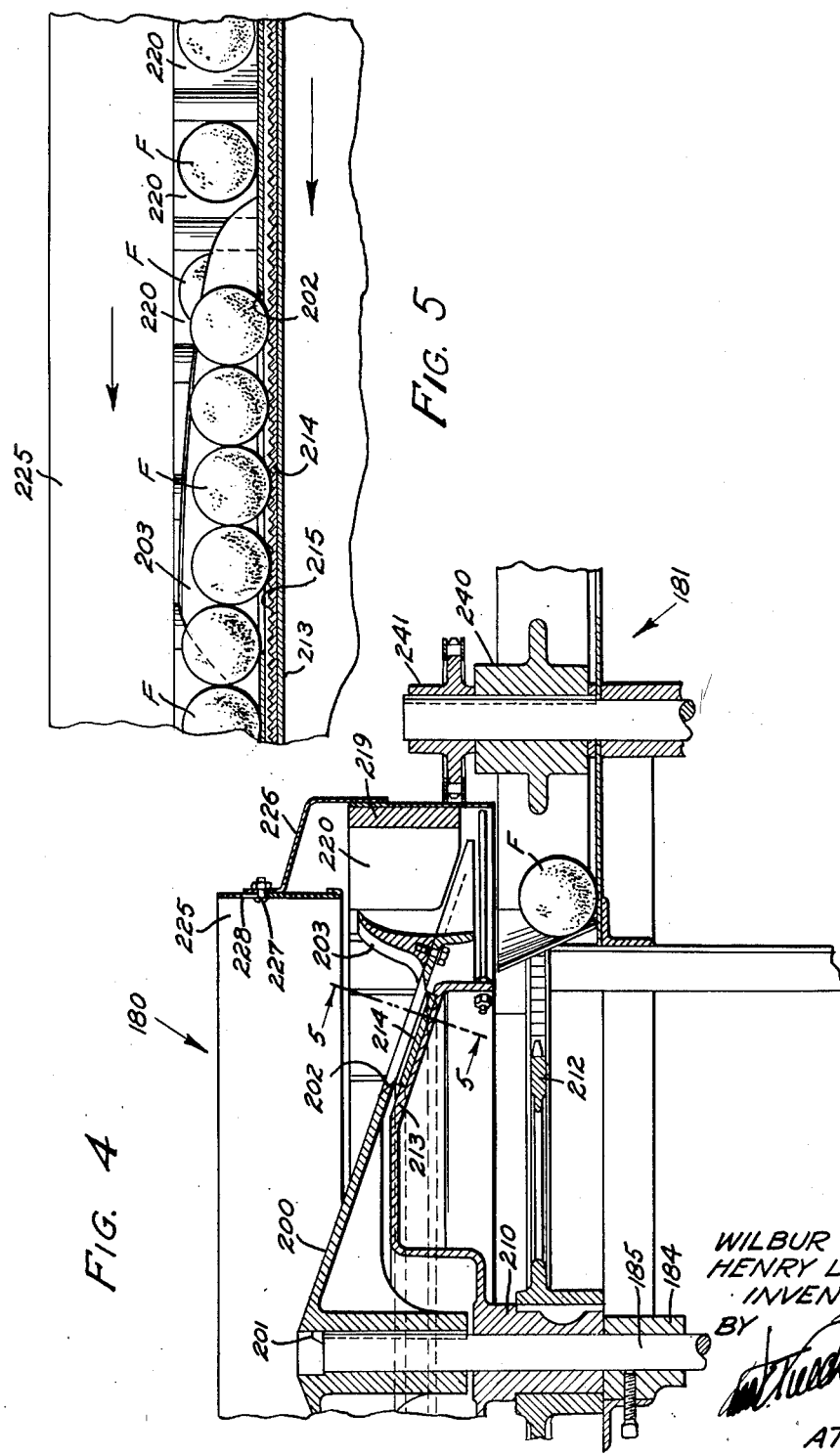

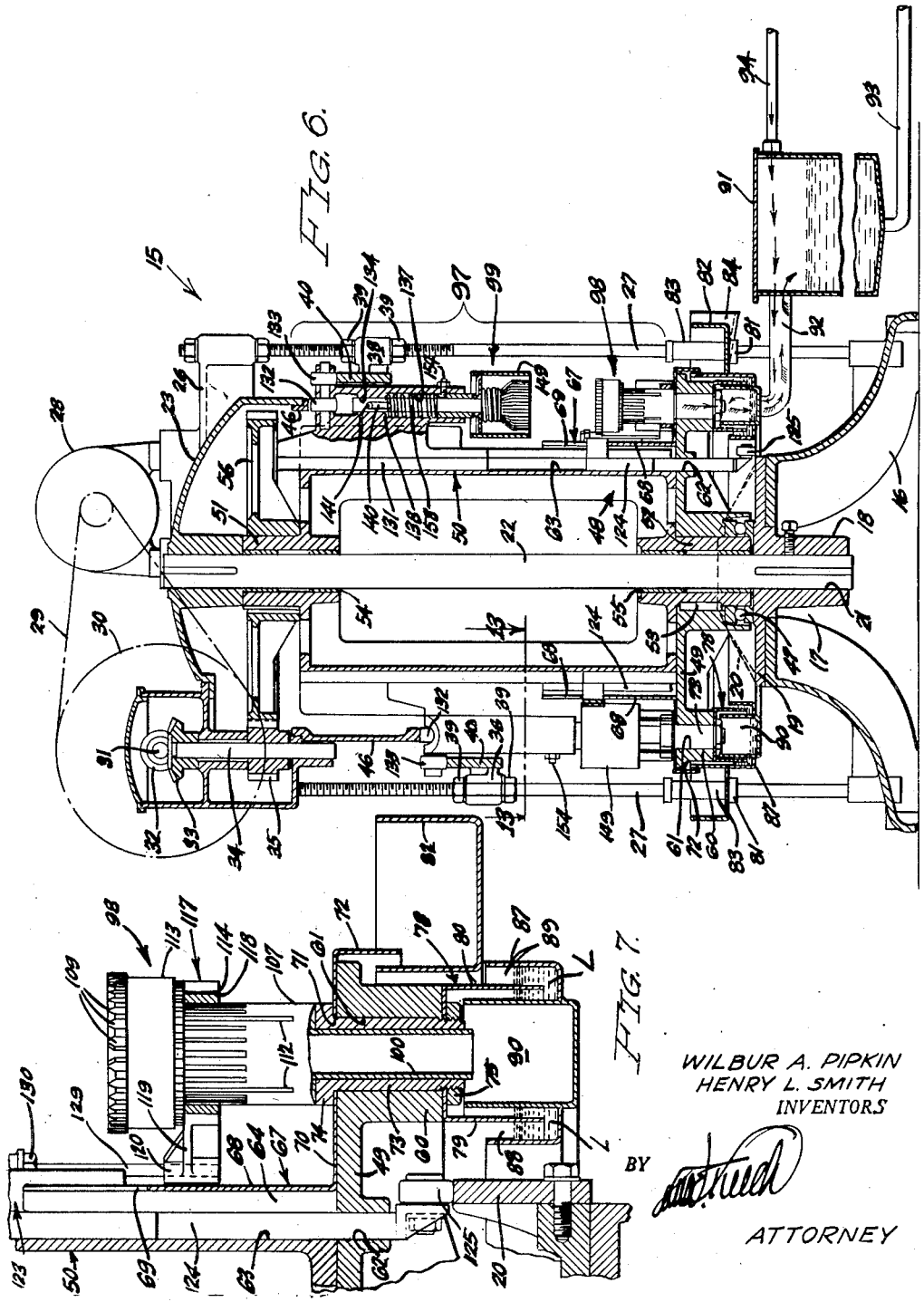

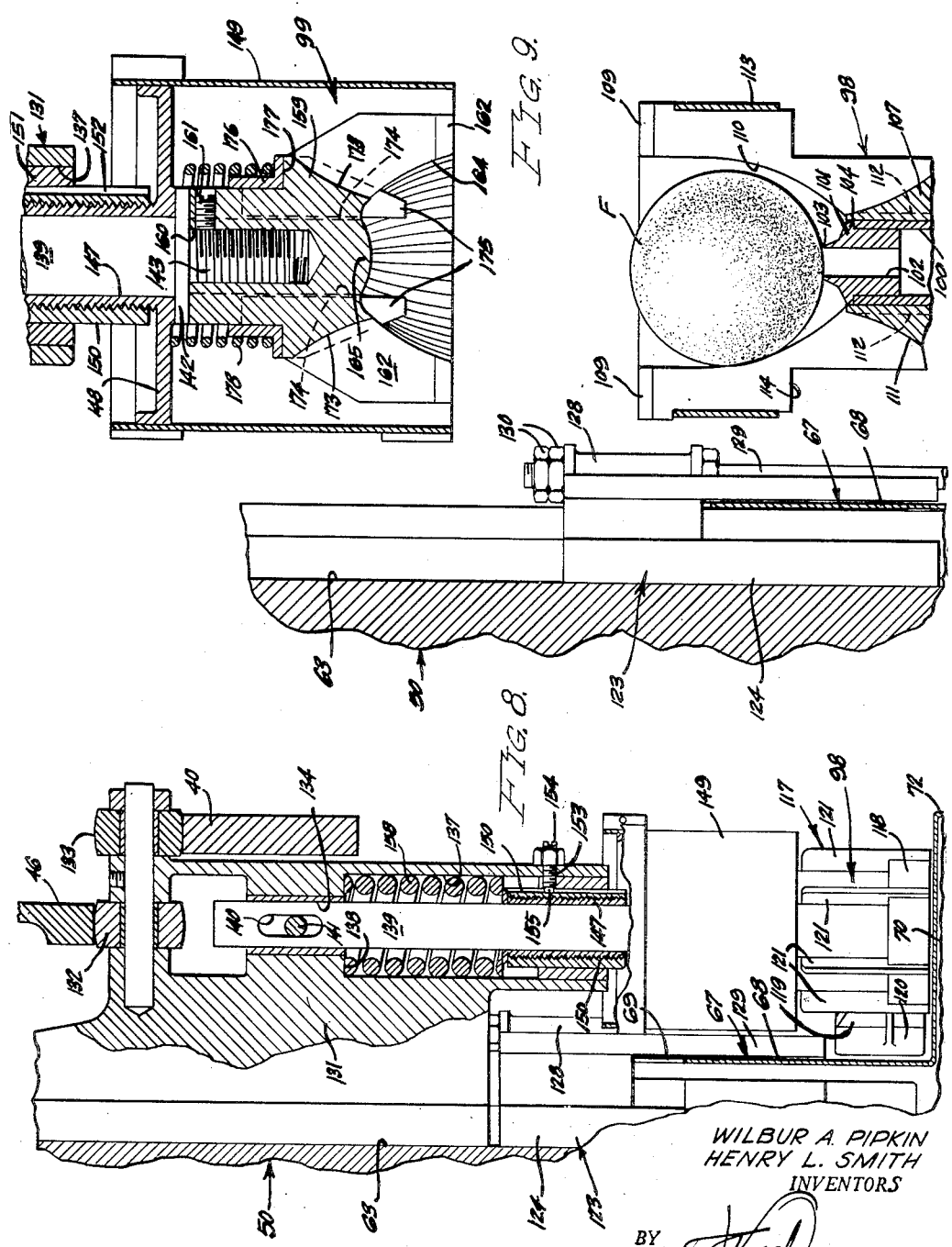

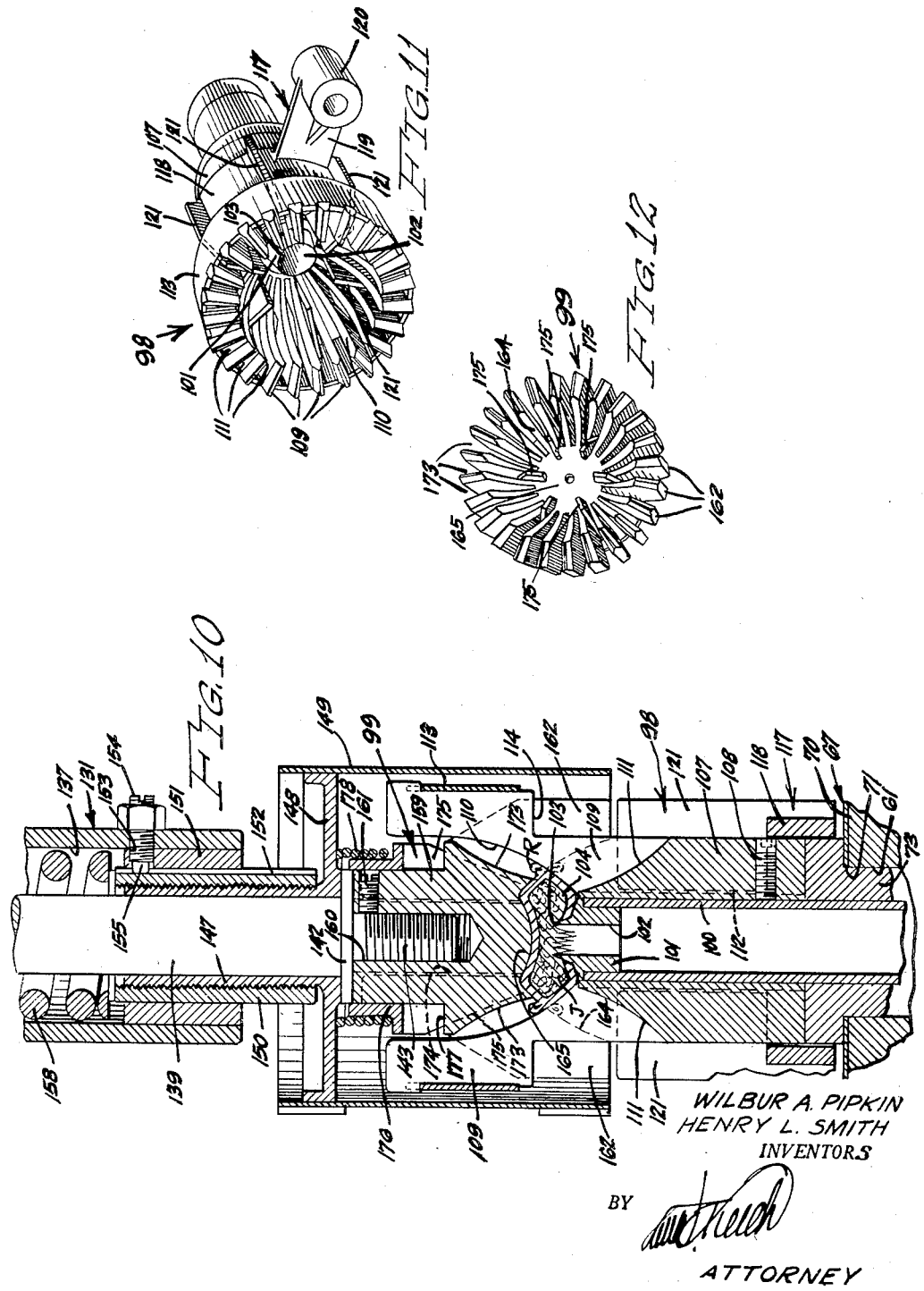

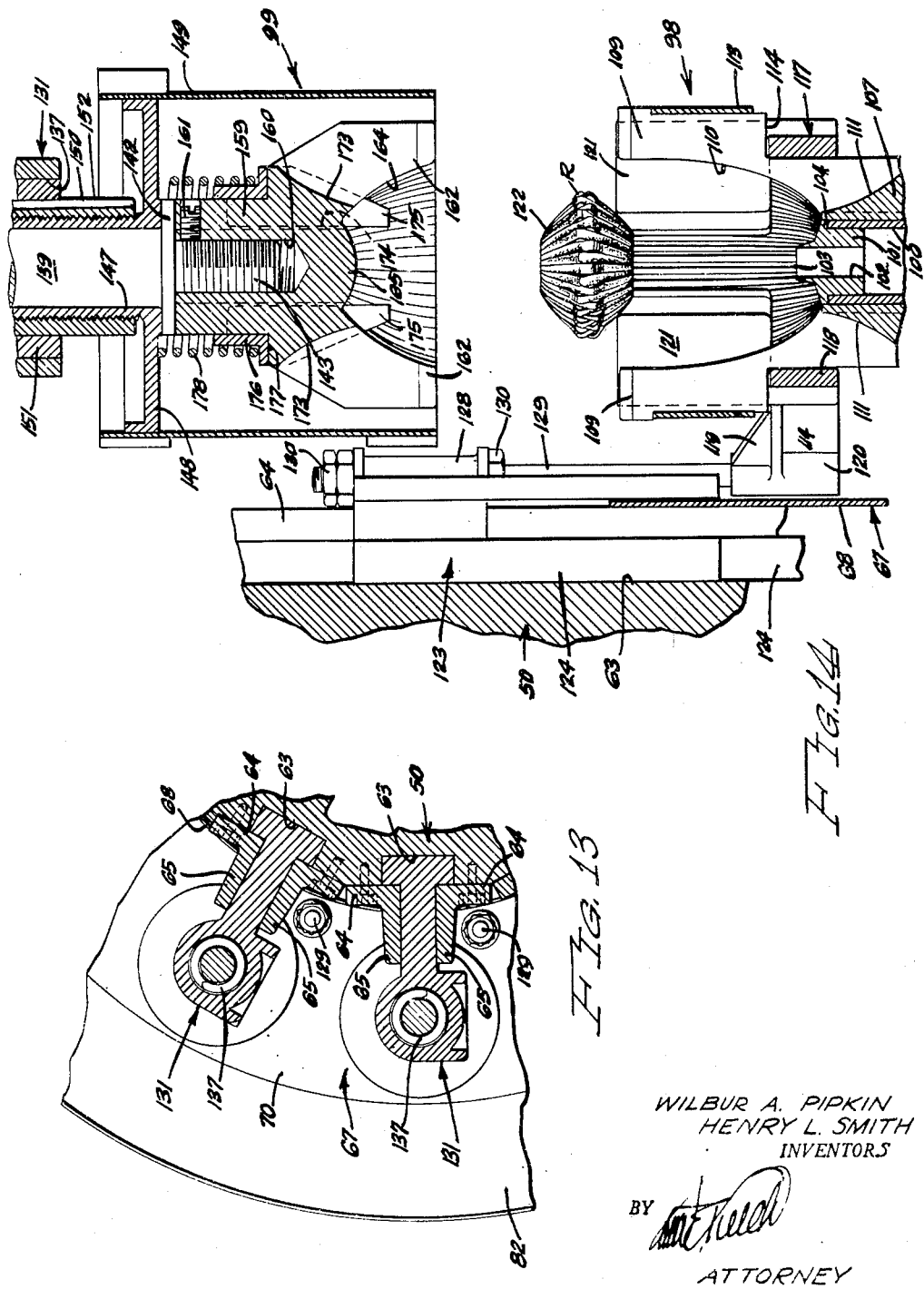

Patented Dec. 23, 1952

2,622,733

UNITED STATES PATENT OFFICE 2,622,733

FEEDER FOR WHOLE CITRUS FRUIT

Wilbur A. Pipkin, Safety Harbor, and Henry L. Smith, Clearwater, Fla.; said Smith assignor to Food Machinery and Chemical Corporation, San Jose, Calif., a corporation of Delaware Application February 1, 1947, Serial No. 725,952

3 Claims. (Cl. 209—73)

This invention relates to apparatus for the extraction of liquids such as juice and rind oils from whole fruits and is particularly useful in the extraction of such liquids from citrus fruits.

In a co-pending application, Serial No. 544,424, of Wilbur A. Pipkin, an extraction apparatus having this general purpose is disclosed. This Pipkin extractor has a rotor mounted on a vertical axis and provided with a circumferentially spaced series of extraction devices, each of which employs vertically spaced compression elements, the upper element of each device being vertically reciprocated as the rotor rotates to receive a whole citrus fruit between it and the lower element of that device and then to compress said fruit and, in one operation, extract the juice and rind oil separately from said fruit. The upper elements are operated by cams in response to the rotation of the rotor.

A whole fruit is fed mechanically into each extracting device when the upper element thereof is lifted. As said upper element again lifts following the extraction of liquid from said fruit, the depleted carcass of the fruit is elevated by an ejector from the lower extractor element and then whisked away by a mechanism provided for this purpose, thereby leaving this device ready to receive another whole fruit.

The capacity with which this Pipkin extractor can perform is enhanced by its having a means for feeding whole fruit thereto which will deliver the fruit to the respective extraction devices on the rotor at relatively high speed, yet without damage to the fruit, and which will make few misses, thereby enabling the machine to run at maximum capacity.

It is an object of the present invention to provide a whole fruit feeding and liquid extraction apparatus having a feeding device fulfilling the requirements noted.

It is another object of the invention to provide a novel article feeding device, suitable for feeding articles singly for any desired purpose.

The manner of accomplishing the foregoing objects, as well as further objects and advantages, will be made manifest in the following description taken in connection with the accompanying drawings in which:

Fig. 1 is a view in plan of a preferred embodiment of the feeder of this invention associated with a Pipkin type extractor with the latter shown in section as taken on the line 1—1 of Fig. 3.

Fig. 2 is a diagram in plan of the power transmission of said extractor.

Fig. 3 is an elevational view of Fig. 1, partly broken away on the section line 3—3 of Fig. 1, to illustrate the construction of said feeder.

Fig. 4 is a fragmentary enlarged sectional view taken on the line 4—4 of Fig. 1, and showing the details of construction of said feeder.

Fig. 5 is an enlarged fragmentary sectional view taken on the line 5—5 of Fig. 1.

Fig. 6 is a diagrammatical vertical sectional view taken on the line 6—6 in Fig. 1.

Fig. 7 is an enlarged fragmentary detail view taken on the line 7—7 of Fig. 1.

Fig. 8 is an enlarged vertical sectional view of an extraction device of the invention in fruit compressing position.

Fig. 9 is a still further enlarged vertical sectional view of the upper and lower cups of an extraction device as these are coming together for a liquid extraction operation after an orange has been fed into a lower cup and before such cups enter into interdigitating relation.

Fig. 10 is a view similar to Fig. 9 and illustrates the completion of the compression of a whole fruit in the juice and peel oil extracting operation.

Fig. 11 is a perspective view of a preferred embodiment of the lower compression cup employed in the invention.

Fig. 12 is a perspective view of a preferred embodiment of the upper compression cup employed in the invention.

Fig. 13 is an enlarged detailed horizontal sectional view taken on the line 13—13 of Fig. 6.

Fig. 14 is a view similar to Fig. 10 and illustrates a succeeding step in the operation of the invention in which the upper cup is lifted into upwardly spaced relation with the lower cup. The carcass of the whole fruit just operated upon is stripped downwardly from the upper cup and lifted upwardly from the lower cup into a position of readiness to be ejected from the machine.

Referring specifically to the drawings, the apparatus of this invention as shown therein, is embodied in a peel oil and juice extractor 15. This includes a pedestal 16, a central opening 17 of which receives a boss 18 of a cap plate 19 having a cam wall 20. Fixed in a central bore 21 of the boss 18 is a shaft 22 to the upper end of which is fixed a head casting 23. The head casting 23 has arms 26 which are connected by rods 27 to the pedestal 16 to rigidly unite and properly space the pedestal 16 from the head casting 23. The head casting supports a motor 28 which is connected through belts 29 and pulley 30 to a shaft 31 which, through bevel-gears 32 and 33, rotates a shaft 34 carrying a master pinion 35.

Collars 38, surrounding the rods 27 and positioned vertically thereon by nuts 39, are formed integral with and support a lower annular cam 40. This cam is connected by brackets 45 to an upper cam 46 so that the upper cam is forced upwardly into assembled relation with the head casting 23. As shown in Figs. 1 and 6, the upper cam 46 is disposed inwardly from and concentric with the lower cam 40. Resting on the plate 19 is a thrust bearing 47 which supports the rotor 48 of the machine. This rotor includes a rotor platform 49 which rests directly on the bearing 47, a slideway cylinder 50 having upper and lower hub-like sleeves 51 and 52, the latter extending into the bearing 47 and being keyed to the platform 49 by a key 53. Sleeves 51 and 52 have bushings 54 and 55 which form bearings on the shaft 22. Mounted about the upper sleeve 51 and keyed thereto is a master gear 56 which meshes with the pinion 35.

The rotor platform 49 has an annular downward extension 60 near its outer edge which is provided with a series of 12 bores 61. Ejector stem guide holes 62 are provided in the platform, one of these being disposed close to each of the bores 61 and inwardly therefrom as shown in Figs. 6 and 7.

The holes 62 are formed in downward extension of and in alignment with slideways 63 provided in the cylinder 50. These slideways are given a T cross section (see Fig. 13) by slide gibs 64 secured to the outer face of the cylinder 50, these gibs having outward extensions 65 formed on the upper portions thereof.

The platform 49 is provided with a stainless steel apron 67, having a cylindrical portion 68, which closely surrounds the lower portion of the cylinder 50 and is provided with slots 69 which register with the adjacent lower portions of the slideways 63. The apron 67 also includes a horizontal portion 70 which lies flat against the platform 49 and has holes 71 which register with the bores 61. Depending from the outer edge of the apron portion 70 is an annular lip 72.

Each of the bores 61 receives a sleeve 73 having an upper flange 74 and threadedly receiving a nut 75 at its lower end to secure this sleeve in said bore and thus hold the apron 67 rigidly in place on the platform 49. A sheet metal annulus 76 is provided, this having an inverted U cross section to provide downwardly extending walls 79 and 80, and holes which receive the lower ends of the sleeves 73 so that when the nuts 75 are tightened on the latter, the annulus 76 is united with the platform extension 60.

Supported on collars 81 on the rods 27 is an annular oil collecting trough 82 having sleeves 83, which surround the rods 27, and a discharge spout 84. Supported on the trough 82 or in any suitable manner is an annular juice-receiving trough 87, having concentrically united therewith troughs 88 and 89 into which the walls 79 and 80 extend downwardly. A liquid L is provided in these troughs to form liquid traps which maintain an air tight seal for excluding air from the juice-receiving chamber 90 within the trough 87.

Leading from the chamber 90 to a juice reservoir 91 is a tube 92. Also connecting with the reservoir 91 is a juice eduction pipe 93 and a gas supply pipe 94.

Mounted upon the rotor 48 is a series of extracting mechanisms 97, each of which includes a lower cup 98 and an upper cup 99, with suitable means for supporting and operating these. As all of the mechanisms 97 are identical, a description of one will suffice for all.

Illustrations of a lower cup 98 may be found in Figs. 10 and 11. This cup includes a stainless steel tube 100 which has a driven fit in one of the sleeves 73 so as to permanently fix the tube 73 in this sleeve. Mounted in the upper end of the tube 100 (see Fig. 10) is a button cutter 101 having a central passage 102, an annular knife 103 surrounding the upper end of this, and a sloping shoulder 104 which rests upon the upper end of the tube 100.

Surrounding the tube 100 where this extends above the sleeve 73 is a cylindrical cup body 107 having a set screw 108 which fixes this to the tube 100. Formed integral with the cup body 107 is a series of twenty-four fingers 109 which are circumferentially arranged in radial relation with the axis of the cup to form a cup bowl 110 at the bottom of which is located the button cutter 101. The fingers 109 are separated by slots 111 which are slightly wider than the fingers themselves. Certain of the slots 111 are extended downwardly to form ejector slots 112. There are preferably twenty-four fingers 109 and slots 111 in each cup 98 and six of the ejector slots 112.

The fingers 109 may be reinforced as by an annular band 113 encircling the upper portion of the cup 98. The upper ends of the fingers 109 may be beveled as shown in Fig. 11 for a purpose to be made clear hereinafter. Fingers 109 preferably have notches 114 provided therein to extend the cylindrical character of the body 107 upwardly as shown in Fig. 10.

Each cup 98 has an ejector 117. This ejector includes a base ring 118 on which is fixed an actuating arm 119 having a long eye 120 at its outer end. The base ring 118 also has formed thereon a series of ejector blades 121, each of which lies in one of the ejector slots 112. Each ejector 117 is adapted to rest in a downward position in which it is shown in Fig. 10 or to be elevated into an upper position in which it is shown in Fig. 14. When lifted to the latter position, the blades 121 extend upwardly through the bowl 110 of the cup 98 to lift a carcass 122 of an orange upwardly out of this bowl.

Vertically slideable in a lower portion of the slideway 63 (see Fig. 14) adjacent each of the cups 98 is a T-head 123 having a shank 124 which extends downwardly through the slideway 63 and hole 62 in alignment therewith, this shank having a roller 125 mounted on its lower end so that this roller is in vertical alignment with the cam wall 20. The T-head 123 has a long eye 128 formed integral therewith, there being a rod 129 which screws into suitable threads provided in the eye 120 and also extends through the eye 128 and is secured in a given vertical relation therewith by nuts 130.

The cam 20 lifts each roller 125 as the rotor 48 rotates to shift the ejector 117 associated therewith from its lowermost position as shown in Fig. 6 to its uppermost position as shown in Fig. 9 and back again to its lowermost position. The period wherein this takes place will be pointed out hereinafter. When each of the T-heads 125 thus reciprocates, it extends through one of the slots 69 in the cylindrical portion 68 of the apron 67. (See Figs. 6 and 7.)

Illustrations of the upper cup 99 may be found in Figs. 9, 10 and 12. Each of these cups is mounted on a T-head 131 sliding in an upper portion of one of the slideways 63. This T-head 131 has a pair of cam follower rollers 132 and 133, the first of these following upper cam 46 and the other following lower cam 49. (See Figs. 1 and 8.)

The T-head 131 has a vertical bore 134 which is disposed in vertical alignment with the roller 132 and which has a counterbore 137, at the upper end of which is a shoulder 138. Slideable in the bore 134 is a cup stem 139 in the form of a shaft having an eye slot 140, there being a pin 141 mounted in the head 131 and extending through said slot to permit a limited degree of vertical movement of the stem 139 relative to the head 131.

The lower end of the stem 139 (see Fig. 14) has an annular flange 142 and a threaded nipple 143 extending axially downward therefrom. Surrounding the stem 139 and resting downwardly on the flange 142 is a tube 147 having a housing head plate 148 flaring outwardly therefrom and carrying a cylindrical housing shell 149. The tube 147 is externally threaded and has screwed thereon a bushing 150 having a longitudinal groove 152 cut therein. Secured in the lower end of bore 137 so as to slideably receive the bushing 150 is a bushing 151. Screwed into a threaded hole 153, formed in the wall of the bore 137 and in the bushing 151, is a screw 154 having a guide tit 155 provided on its inner extremity, this tit extending into the guide groove 152 of the bushing 150. Trapped in the counterbore 137 between the upper end of the bushing 150 and the shoulder 138 is a heavy coiled expansion spring 158.

The upper cup 99 (see Figs. 10 and 12) also includes a cup body 159 having a threaded bore 160 into which the nipple 143 screws to assemble the body 159 on the stem 139. The body is held in this assembled relation by a set screw 161. The body 159 has a series of twenty-four fingers 162 formed integrally therewith and spaced circumferentially in radial planes with respect to the axis of the cup 99. The inner surfaces of the fingers 162 are shaped to form an inverted bowl 164, the bottom 165 of which may be concave, or flat, or it may be convex as shown in Fig. 9. It is preferable, however, to make this convex, as shown. The fingers 162 are separated by slots 173 which are slightly wider than the fingers.

Certain of the slots 173 are deepened to form slots 174 in which ejector blades 175 are slideably disposed. These blades are united by a collar 176 which is slideably mounted on the body 159 and is pressed against a shoulder 177 thereof by an expansion spring 178. When the collar 176 is thus yieldably held downward, the ejector blades 175 extend downwardly into the upper cup bowl 164 as shown in Fig. 9.

In each of the mechanisms 97 the upper and lower cups 99 and 98 are co-axial and the upper cup body 159 is so mounted on the stem 139 that the slots 173 of the upper cup are in alignment with the fingers 109 of the lower cup while the fingers 162 of the upper cup are in alignment with the slots 111 of the lower cup. The fingers of the upper and lower cups thus by-pass each other in inter-digitating relation when the upper cup 99 is lowered as shown in Fig. 10.

The juice extractor 15 has a whole fruit feed and carcass removing mechanism 179 which embraces a primary feeder 180, a secondary feeder 181 and a carcass remover 182 (see Figs. 1, 3, 4, and 5). The mechanism 179 includes a frame 183 provided with bearings 184 in which a shaft 185 is vertically fixed. Other bearings including bearing 186 are provided on the frame 183 on which a shaft 187 is vertically journaled. Still other bearings including bearing 190 are provided on the frame 183 in which shaft 191 is vertically journaled. Other suitable bearings, not shown are provided on the frame 183 in which a shaft 195 is vertically journaled. The frame 183 also has a bearing 196 in which is journaled a shaft 197.

The primary whole fruit feeder 180 includes a conical feed hopper deck 200, which is fixed on the upper end of the shaft 185 and held in non-rotatable relation therewith by a key 201. This deck has a segmental shaped window 202 and an arcuate baffle wall 203 disposed radially outwardly from the window 202 and rising upwardly from the deck. This wall is shown in section in Figs. 3 and 4, in plan in Fig. 1 and in elevation in Fig. 5.

The peripheral portion of the deck 200 which lies beyond the radius of the baffle wall 203 forms a fruit race 204. The fruit race 204 is cut away behind the baffle wall 203 to provide a discharge hole 205. Rotatably mounted on the shaft 185 between the upper bearing 184 and the hub of the conical deck 201 is the hub 210 of a primary fruit feeder wheel 211. The hub 210 has fixed thereon a sprocket 212 for driving the wheel 211 which has a disk-like body 213, a frusto conical portion 214 of which is provided with a roughened annular track 215 which is adapted to travel continuously past the window 202 and directly therebeneath (see Figs. 1, 4 and 5). Extending radially from the outer edge of the wheel disk 213 are spaced rods 216, the outer ends of which connect with and support an annular metal wall 217 of a fruit feeding annulus 218. This annulus includes a wooden ring 219 which has circumferentially spaced pockets 220 comprising vertical openings formed therein which open inwardly so that fruit deposited on deck 201 tends to roll into and be retained in the pockets 220 with one of said pieces of fruit to each of said pockets (see Fig. 1). The fruit, when thus located in the pockets 220, overlies and rests upon the fruit race 204 (see Fig. 3). Thus when the annulus 218 is rotated, in the manner to be pointed out hereinafter, individual whole pieces of fruit retained in the pockets 220 are successively brought over the hole 205 in the fruit race 204 and dropped through this hole. When the annulus 218 is thus rotated, the roughened track 215 exposed through the window 202 moves continuously past this window so that fruit rolling against the baffle wall 203 is constantly conveyed away from in front of this wall and in the direction of rotation of the primary fruit feeder 180 thereby preventing fruit damming up in front of this baffle and overflowing.

The annulus 218 is also provided with an annular sheet metal hopper mouth 225 which is supported on six spaced brackets 226, fixed on the annular wall 217. The mouth 225 is mounted on the brackets 226 by bolts 227 which extend through suitable vertical slots 228 in the hopper mouth 225 to permit this to be adjusted vertically for a purpose which will be made clear hereinafter.

Fruit such as whole oranges F may be fed onto the deck 200 either by dumping these from a box or by delivering them along a sloping chute 229.

The spaced rods 216 of the primary fruit feeder 180 are located so as to lie between adjacent pockets 220.

The secondary fruit feeder 181 is mounted on the frame 183 so that the outer portion of this feeder extends beneath primary fruit feeder 180 right at the location of the hole 205 while its opposite portion extends between the lower and upper cups 98 and 99 where these are separated by the upper cup being lifted upwardly. The feeder 181 includes a disk-like floor 236 which surrounds the shaft 197 and has a discharge hole 237 formed therein which overlies the lower cups 98 as these pass therebeneath. The floor 236 is disposed close above the level of the upper ends of these cups. The feeder 181 also includes a guide wall 238 which partially surrounds the floor 236 as shown in Figs. 1 and 3. The wall 238 is concentric with the shaft 197, excepting the inner end portion 239 thereof, which is concentric with the main rotor shaft 22.

Fixed on the shaft 197 is a feed wheel 240 and a sprocket 241, the wheel 240 having a series of blades 242 between which are formed an annular series of recesses 243 for the feeding of whole fruit. Each of these recesses is adapted to receive a single piece of fruit and feed the same, this piece of fruit, while being so fed, being supported on the floor 236.

The carcass remover 182 comprises a floor plate 251, which is mounted on the frame 183 just in advance of the secondary fruit feeder 181 on a level close above the upper edges of the rind ejectors 117 of the lower cups when these ejectors are elevated to their uppermost positions in ejecting fruit carcasses from the lower cups. As shown in Fig. 1, this floor is semi-cylindrical in shape and concentric with the shaft 195 and is cut away at 252 to provide a scraper blade 253 which extends directly across the path travelled by a fruit carcass supported by an ejector in upwardmost position. Surrounding the concentric portion of the outer edge of the floor 251 is a wall 254. Opening downwardly from floor 251 is a carcass discharge pipe 255.

Mounted on the shaft 195 is a carcass removing paddle wheel 256 having four paddles 257 for sweeping carcasses onto the floor 251 and over the discharge pipe 255 into which they drop. A suitable container or conveyor (not shown) is provided to receive these carcasses from the lower end of the pipe.

The various rotating elements of the mechanism 179 are driven coordinately as follows:

Referring to Fig. 2, it is noted that shaft 31 is connected by a gear transmission 260 to a shaft 261, which drives the shaft 195 through a worm gear transmission 262. The shaft 195 is thus rotated, in the direction of the arrow adjacent thereto in Fig. 1, in timed relation with the rotation of the juice extractor rotor 50 so that each time one of the lower cups 98 approaches the carcass remover 259, as a carcass is being ejected upwardly from that cup, one of the arms 257 sweeps that carcass off onto the scraper blade 253 of the floor 251. With the continued rotation with the paddle wheel 256, this carcass is dropped down the discharge pipe 225.

As shown in Fig. 1, the shaft 195 has a sprocket 265 and the shaft 191 a sprocket 266 which are connected by a chain 267 so that said shaft 191 is rotated in the same direction as the shaft 195.

The shaft 191 has a sprocket 270 which is connected by an endless chain 271 to the sprocket 241. By this connection, rotation is transmitted to the wheel 240, causing the latter to turn in the direction of the arrow superimposed thereon in Fig. 1 to cause successive recesses 243 to arrive opposite the hole 237 synchronously with the arrival of the respective lower cups 98 directly therebeneath so that as each piece of fruit F, conveyed by the wheel 240 in one of the recesses 243 reaches the hole 237, it gravitates through this into a cup 98 disposed therebeneath. It is, of course, also to be noted that each whole fruit, at the time it is thus fed through the hole 237 into one of the cups 98, is travelling in the same direction as said cup and at substantially the same speed.

The shaft 191 is also provided with a spur gear 280 which meshes with a gear 281 fixed on the shaft 187. The latter shaft also has a pinion sprocket 282 which is connected by a chain 283 to the sprocket 212 of the primary feeder wheel 211, whereby the latter is rotated in the direction of the arrow adjacent thereto in Fig. 1, and synchronously with the secondary feeder wheel 240, so that a piece of fruit F is fed through the hole 205 of the primary feeder into each of the recesses 243 as this comes into position beneath and opposite one of the pockets 220 of the primary feeder.

*Operation*

The motor 28 is first energized to set in motion the various parts of the apparatus 15 as above described. Fruit F, selected by sizing to come within a range of sizes suitable for feeding by the feeders 180 and 181, is now fed through the chute 28 to the primary feeder wheel 211. This fruit rolls down the deck 209 and into the pockets 220 of the rotating annulus 218. The piece of fruit in each pocket as the latter comes over the hole 205 drops downwardly through this hole into the recess 243 immediately therebeneath and is conveyed in this recess by rotation of the wheel 240 in a semi-circular path until this piece of fruit is shifted out over the hole 237 just as a cup 98 comes into position immediately therebeneath to receive the same.

Thus each of the cups 98 has a whole fruit F fed thereto just after the roller 125 of the ejector of that cup has travelled downwardly off of the high portion of the cam 20 so that the space within the cup is unencumbered by the ejector and free to receive the fruit delivered thereto. As the rotor 50 turns from this point the upper cup 99 of this extraction device 97 is forced downwardly by cam 46 to compress the fruit between the upper and lower cups, impale the fruit on the cutter 103 to cut a hole in the rind, following which the fruit, which has been brought into conformity with the inner surfaces of the two cups by the pressure thereagainst, is constricted so as to expel the juice from the interior of the fruit through the hole formed in the rind by the cutter 103. This constriction of the fruit reduces it to a small fraction of the space formerly occupied by it, and not only removes the juice which flows downwardly through the passage 102 and the tube 100, but expresses the oil from the rind of the fruit by application of tremendous pressures thereagainst in the closely spaced localized areas in which the fingers of the upper and lower cups engage the rind of the fruit.

The juice thus expressed flows downwardly from the tubes 100 of the various cups into the annular chamber 90 from which it flows through the pipe 92 into the reservoir 91.

The peel oil expressed from the peel of the fruit thus treated gathers on the surfaces of the lower and upper cups 98 and 99 from which the oil gravitates onto the stainless steel apron 72, and from this into the trough 82 provided for receiving the same.

As the rotor 50 continues to rotate, the extraction operation just described is followed by the lifting of each of the upper cups 99 by the cam 40 engaging the cam follower wheel 133 of said upper cup. At the same time the ejector of the corresponding lower cup 98 is lifted by the roller 125 riding up onto the high point of the cam 120 until the carcass produced by the compression of the fruit F is ejected from said lower cup as shown in Fig. 14, into a position where the carcass is supported on the ejector where it may be readily swept off by the paddle 257 engaging the same as this carcass comes into contact with the scraper blade 253 of the carcass remover 182.

The annular hopper mouth 225 may be lowered to an adjusted level with this mouth extending inside of the pocket annulus 218 so that the lower edge of this mouth engages the fruit and prevents a piece of fruit entering one of the pockets 220 which is too large to be handled by that particular annulus 218. The lower edge of the mouth 225 also serves to prevent the crowding of more than one piece of fruit into one of the pockets 220 where the pieces of fruit are of relatively small diameter.

Citrus fruit generally varies in diameter from as much as 4½ inches to as little as 1½ inches. It has been found preferable to segregate this fruit into two or three size groups and make extractors of the Pipkin type, illustrated herein, with two or three variations with respect to the size of the cups 98 and 99 with which these are fitted so that one machine will be provided with cups of a size suitable for handling each of the groups into which the fruit is divided. To adapt the feeder of this invention to handle each of these fruit size groups, the feed annulus 218 of the primary feeder 180 is adapted to be replaced by another annulus with cups 220 of a different size. Thus all the other parts of the mechanism 179 of the present invention may be standard.

When the deck 200 is crowded with fruit, the latter tends to collect at the end of the baffle wall 203 towards which the annulus 218 travels. This wall extends between each piece of fruit, within one of the pockets 220, and the pieces of fruit held from entering that pocket by the piece of fruit therein. The fruit thus excluded from the pocket is fed by friction with the annulus 218 along the inner face of the baffle wall 203 and onto the travelling track 215 which is exposed through the window 202. This track carries this truck past the baffle wall 203 after which it gravitates over the surface of the conical deck 200 and into one of the pockets 220.

While the invention is disclosed in its preferred form with a secondary feeder for transferring to the juice extractor a series of individual pieces of fruit into which the primary feeder breaks up the mass of fruit fed thereto, it is to be understood that it may be preferable in some circumstances to employ the primary feeder itself to deliver individual pieces of fruit to the lower cups of the juice extractor. When the invention is to be so used, the primary feeder itself is positioned to extend between lower and upper cups 98 and 99 in a similar manner as the secondary feeder in the preferred embodiment extends between these cups. In that case the design of baffle wall 203 and hole 205, and the direction of rotation of the annulus 218 would be reversed and the pieces of fruit would be dropped directly through the hole 205 into the respective lower cups 98.

From the above remarks it is to be understood that the illustrated embodiment is subject to considerable modification while still remaining within the spirit of the invention and the scope of the appended claims.

We claim:

1. In a device for feeding whole citrus fruit, the combination of: a stationary substantially conical deck; an annulus rotating about a vertical axis passing through said conical deck, said annulus comprising an outer ring and a plurality of inwardly extending radial vertical blades, the annulus being located above and overlying the deck so that said ring, said blades and said deck form pockets to receive and transport the individual fruit, a portion of the deck being arranged to provide a downward opening for the discharge of fruit from the pockets; and a substantially concentric arcuate baffle wall formed on said deck and rising therefrom closely adjacent to the mouths of said pockets, said wall being disposed adjacent the location of said downward opening to prevent the feeding of whole citrus fruit to any of said pockets while the latter is in alignment with said opening.

2. A combination as in claim 1 in which said deck has an arcuate concentric window disposed just inwardly from said wall; a roughened track rotatably mounted concentric with said deck and therebeneath so as to appear through said window and support fruit just inwardly from said wall; and means to rotate said annulus and said track to accomplish the uniform feeding of fruit delivered in bulk onto said deck one at a time and at regular timed intervals downwardly through said opening.

3. A combination as in claim 1 including an annular hopper mouth member; and means for mounting said member on said annulus whereby said member is concentric therewith, said member fitting within said annulus, said mounting means including means for adjusting the vertical relation of said mouth with said annulus whereby the spacing of said mouth above said deck determines the diameter of fruit admissible between said deck and said annulus and into said pockets.

WILBUR A. PIPKIN.
HENRY L. SMITH.

REFERENCES CITED

The following references are of record in the file of this patent:

UNITED STATES PATENTS

| Number | Name | Date |
|---|---|---|
| 990,593 | Ringland | Apr. 25, 1911 |
| 1,044,905 | Nesvant | Nov. 19, 1912 |
| 1,109,861 | Moss | Sept. 8, 1914 |
| 1,173,308 | Rockwell | Feb. 29, 1916 |
| 1,248,339 | Kallenbach | Nov. 27, 1917 |
| 1,326,117 | Thomas | Dec. 23, 1919 |
| 1,698,476 | Frova | Jan. 8, 1929 |
| 1,710,074 | Saviano | Apr. 23, 1929 |
| 2,208,474 | Carroll | July 16, 1940 |
| 2,280,166 | Sinden | Apr. 21, 1942 |
| 2,420,679 | Pipkin | May 20, 1947 |